US012811260B2

(12) United States Patent
Kim et al.

(10) Patent No.: US 12,811,260 B2
(45) Date of Patent: Nov. 24, 2026

(54) SECONDARY BATTERY

(71) Applicant: SAMSUNG SDI CO., LTD., Yongin-si (KR)

(72) Inventors: Sang Hyun Kim, Yongin-si (KR); Jeong Chull Ahn, Yongin-si (KR); Hiroshi Seino, Yongin-si (KR); Sun Yang Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 414 days.

(21) Appl. No.: 18/617,198

(22) Filed: Mar. 26, 2024

(65) Prior Publication Data

US 2025/0087849 A1 Mar. 13, 2025

(30) Foreign Application Priority Data

Sep. 12, 2023 (KR) ........................ 10-2023-0121023

(51) Int. Cl.
*H01M 4/02* (2006.01)
*H01M 50/534* (2021.01)

(52) U.S. Cl.
CPC ................................ *H01M 50/534* (2021.01)

(58) Field of Classification Search
CPC ............. H01M 50/531; H01M 50/533; H01M 50/534; H01M 50/543; H01M 50/547;
(Continued)

(56) References Cited

U.S. PATENT DOCUMENTS 10,784,483 B2 * 9/2020 Han .................. H01M 10/0431
11,557,819 B2 1/2023 Choi
(Continued)

FOREIGN PATENT DOCUMENTS

JP 2004-303590 A 10/2004
JP 2006-302509 A 11/2006
(Continued)

OTHER PUBLICATIONS

Extended European Search Report issued in corresponding EP Application No. 24184182.4, dated Feb. 26, 2025, 6 pages.

*Primary Examiner* — Raymond Alejandro
(74) *Attorney, Agent, or Firm* — Womble Bond Dickinson (US) LLP

(57) ABSTRACT

A secondary battery includes: a first electrode plate including a first substrate having a first active material coated portion coated with a first active material and a first electrode uncoated portion not coated with the first active material; a second electrode plate including on a second substrate having a second active material coated portion coated with a second active material and a second electrode uncoated portion not coated with the second active material; a separator between the first electrode plate and the second electrode plate; an electrode tab connected to one of the first electrode uncoated portion and the second electrode uncoated portion; an insulation tape on the first electrode uncoated portion or the second electrode uncoated portion and covering the electrode tab; and a step compensation unit on a region of an upper surface of the insulation tape excluding a region corresponding to the electrode tab.

12 Claims, 7 Drawing Sheets

(58) Field of Classification Search
CPC ............. H01M 50/471; H01M 50/474; H01M 50/477; H01M 50/489; H01M 50/409; H01M 50/46; H01M 4/0404; H01M 10/052; H01M 10/0525
See application file for complete search history.

(56) References Cited

U.S. PATENT DOCUMENTS

| | | | | |
|---|---|---|---|---|
| 2021/0203048 | A1 | 7/2021 | Choi | |
| 2021/0265708 | A1 | 8/2021 | Lim et al. | |
| 2022/0376321 | A1* | 11/2022 | Kim | H01M 10/653 |
| 2023/0411795 | A1* | 12/2023 | Sun | H01M 10/0422 |

FOREIGN PATENT DOCUMENTS

| | | | |
|---|---|---|---|
| JP | 2021-138125 | A | 9/2024 |
| KR | 10-2469471 | B1 | 11/2022 |
| KR | 10-2473094 | B1 | 12/2022 |

* cited by examiner

SECONDARY BATTERY

CROSS-REFERENCE TO RELATED APPLICATION

This application claims priority to and the benefit of Korean Patent Application No. 10-2023-0121023, filed on Sep. 12, 2023, in the Korean Intellectual Property Office, the entire disclosure of which is incorporated herein by reference.

BACKGROUND

1. Field

Aspects of embodiments of the present disclosure relate to a secondary battery.

2. Description of the Related Art

Different from a primary battery that is not designed to be charged, a secondary battery is a battery that is designed to be (re)charged and discharged. Low-capacity secondary batteries packaged in the form of a pack including a single battery cell are widely employed in portable, small-sized electronic devices, such as cellular phones or camcorders. In some implementations, large-capacity secondary batteries packaged in forms of battery packs including tens of battery cells connected to one another are widely used for driving motors of hybrid vehicles, etc.

Secondary batteries are manufactured in various shapes, and typical shapes thereof include pouch, cylindrical, and square (or prismatic) shapes. A secondary battery is constructed by incorporating an electrode assembly, formed by interposing an insulating separator between positive and negative electrode plates, and an electrolyte into a case.

In some cylindrical secondary batteries, depending on the condition of a jelly roll electrode assembly and a thickness of an electrode tab, pressure may be applied to a substrate at the edge portion of the electrode tab. Stress caused by the pressure may cause cracks to occur along the boundary area of the electrode tab, and in severe cases, may even cause a rupture or breakage.

SUMMARY

Embodiments of the present disclosure provide a secondary battery capable of compensating for pressure applied to an electrode tab by attaching a tape having the same thickness (or thickness level) as the electrode tab to an electrode uncoated portion (e.g., a portion of the electrode not coated with an active material) around the electrode tab.

A secondary battery, according to an embodiment of the present disclosure, includes: a first electrode plate including a first substrate having a first active material coated portion coated with a first active material and a first electrode uncoated portion not coated with the first active material; a second electrode plate including on a second substrate having a second active material coated portion coated with a second active material and a second electrode uncoated portion not coated with the second active material; a separator between the first electrode plate and the second electrode plate; an electrode tab connected to one of the first electrode uncoated portion and the second electrode uncoated portion; an insulation tape on the first electrode uncoated portion or the second electrode uncoated portion and covering the electrode tab; and a step compensation unit on a region of an upper surface of the insulation tape excluding a region corresponding to the electrode tab.

The step compensation unit may include first step compensation units on both ends of the insulation tape at the upper surface of the insulation tape.

The step compensation unit may further include a second step compensation unit on a region of the insulation tape between the first step compensation units and that does not correspond to the electrode tab.

The first step compensation units may be connected to each other with the second step compensation unit therebetween.

A width of the step compensation unit may extend from one end of the electrode tab to one end of the insulation tape.

The insulation tape may be on the upper surface of the first electrode plate to cover the electrode tab, the first electrode uncoated portion, and a portion of the first active material coated portion or may be on the upper surface of the second electrode plate to cover the electrode tab, the second electrode uncoated portion, and a portion of the second active material coated portion.

A thickness $T_2$ of the step compensation unit may be in a range of $0.1*T_1 \leq T_2 \leq 1.5*T_1$, where $T_1$ is a thickness of the electrode tab.

When a thickness of a first layer including the first substrate, the first active material coated portion, and the insulation tape is different from a thickness of a second layer including the first substrate, the electrode tab, and the insulation tape, the step compensation unit may have a thickness that gradually decreases or increases in a direction from the first layer to the second layer; or in when a thickness of a third layer including the second substrate, the second active material coated portion, and the insulation tape is different from a thickness of a fourth layer including the second substrate, the electrode tab, and the insulation tape, the step compensation unit may have a thickness that gradually decreases or increases in a direction from the third layer to the fourth layer.

The insulation tape may be additionally arranged in the same shape on a lower surface opposite to the upper surface of the first electrode uncoated portion or the second electrode uncoated portion to which the electrode tab is connected at a position corresponding to the upper surface; and the step compensation unit may be additionally arranged in the same shape on a lower surface of the first electrode uncoated portion or the second electrode uncoated portion at a position corresponding to the upper surface.

A total thickness $(T_2+T_3)$ of the step compensation unit may be in a range of $0.1*T_1 \leq T_2+T_3 \leq 1.5*T_1$, where $T_1$ is a thickness of the electrode tab, $T_2$ is a thickness of the step compensation unit on the upper surface of the first electrode uncoated portion or the second electrode uncoated portion, and $T_3$ is a thickness of the step compensation unit on the lower surface of the first electrode uncoated portion or the second electrode uncoated portion.

The step compensation unit may include an adhesive tape including a film and an adhesive layer on a lower surface of the film.

The film may include polyimide, polyethylene terephthalate, or polypropylene, and the adhesive layer may include an acrylic compound, a rubber compound, or a hydrocarbon resin compound.

DETAILED DESCRIPTION

Figure 1:
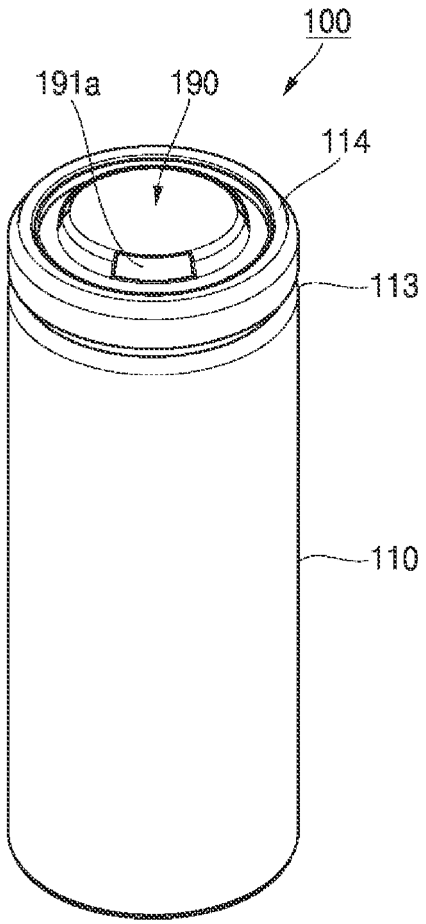
FIGS. 1, 2, and 3 are a perspective view, an exploded perspective view, and a cross-sectional view, respectively, of a secondary battery according to an embodiment of the present disclosure.

Embodiments of the present disclosure are provided to more completely explain aspects and features of the present disclosure to those skilled in the art, and the following embodiments may be modified in various other forms. The present disclosure, however, may be embodied in many different forms and should not be construed as being limited to the embodiments set forth herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a secondary battery 100 according to embodiments of the present disclosure will be described in detail with reference to the accompanying drawings.

Figure 2:
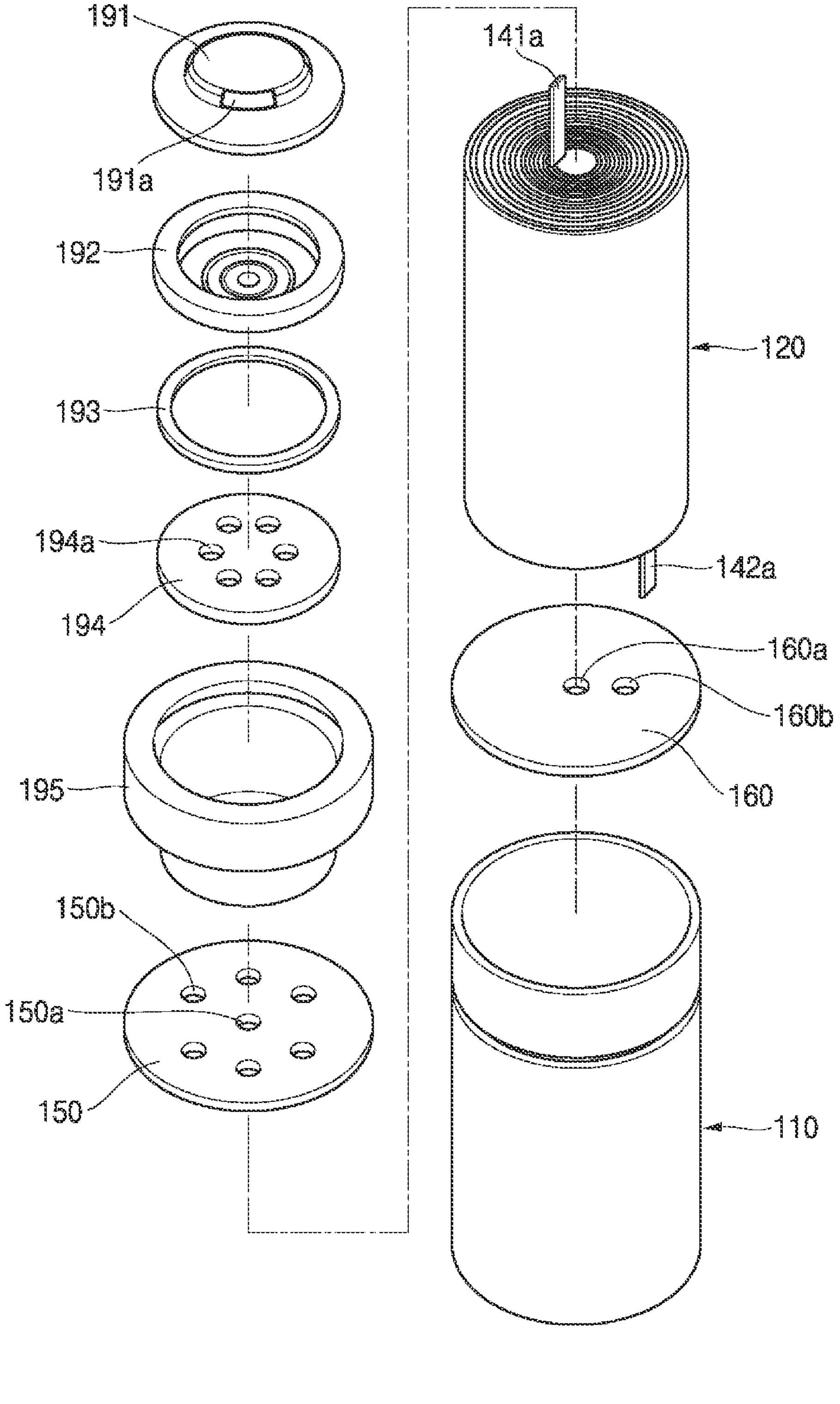
Figure 3:
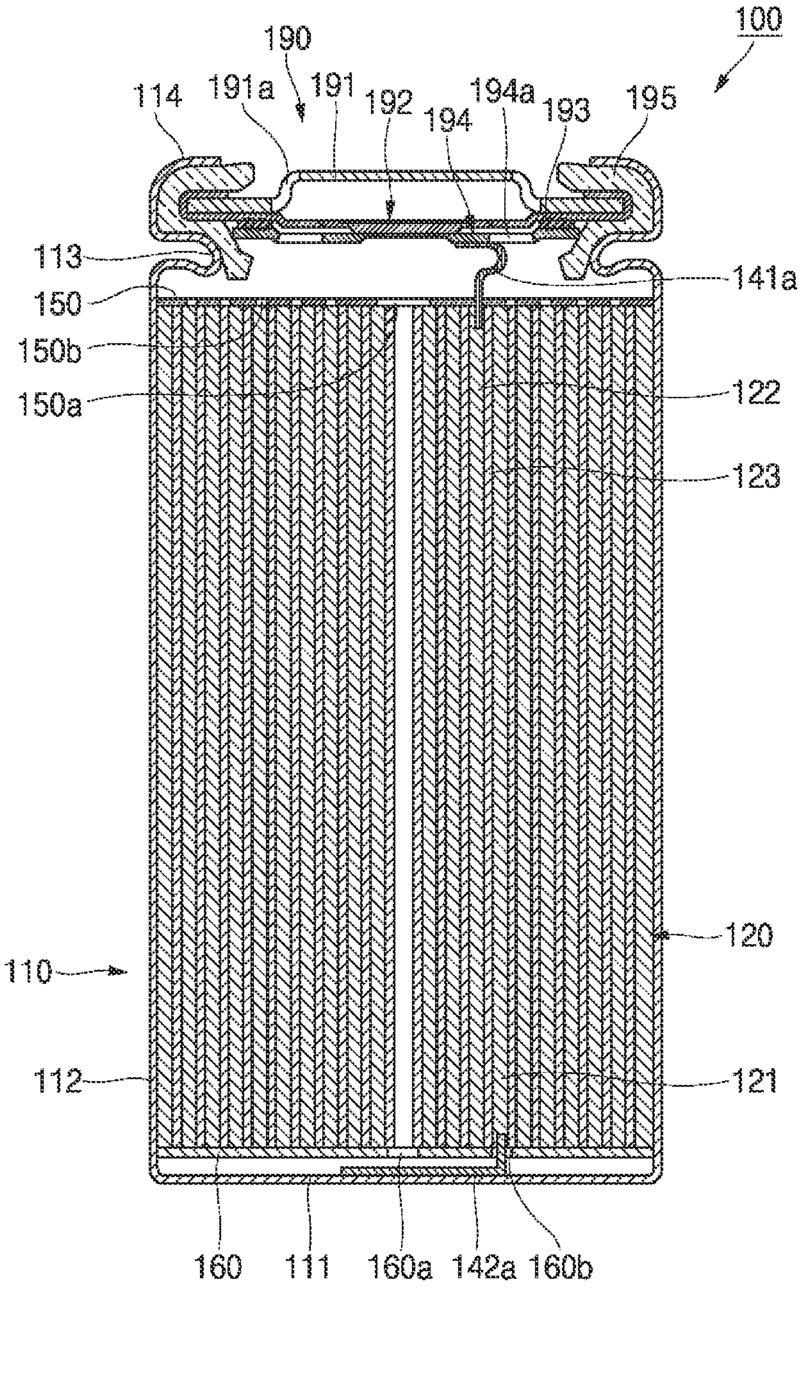

FIGS. 1, 2, and 3 are a perspective view, an exploded perspective view, and a cross-sectional view, respectively, of a secondary battery according to an embodiment of the present disclosure.

Referring to FIGS. 1, 2, and 3, a secondary battery 100, according to an embodiment of the present disclosure, may include a cylindrical can 110, a cylindrical electrode assembly 120, a separator 123, an upper insulating plate 150, a lower insulating plate 160, and a cap assembly 190, and, referring to FIGS. 4 to 12, may further include an insulation tape 170 and a step compensation unit 180.

The can 110 may have a circular bottom portion 111 and a cylindrical side portion 112 extending a length (e.g., a certain length) upwardly from the bottom portion 111. During the manufacturing process of the secondary battery 100, the top portion (or top end) of the cylindrical can 110 may be open. Therefore, during the assembly process of the secondary battery 100, the electrode assembly 120 may be inserted into the cylindrical can 110 together with an electrolyte through the open portion (or open end).

The cylindrical can 110 may include (or may be formed of) steel, a steel alloy, aluminum, an aluminum alloy, or equivalents thereof. In the illustrated embodiment, the can may include or may be referred to as a case or a housing. In the illustrated embodiment, to prevent the electrode assembly 120 and the cap assembly 190 from being separated to the outside, the cylindrical can 110 may have a beading part (e.g., a bead) 113 that is inwardly recessed at the lower portion of (e.g., below) the cap assembly 190 and a crimping part (e.g., a crimped end) 114 that is inwardly bent at the upper portion of (e.g., above) the cap assembly 190.

The electrode assembly 120 may be accommodated inside the cylindrical can 110. The electrode assembly 120 may include a first electrode plate 121, a second electrode plate 122, and the separator 123. In the illustrated embodiment, the first electrode plate 121 may be a positive electrode plate, and the second electrode plate 122 may be a negative electrode plate. In other embodiments, however, the opposite is possible. Hereinafter, for convenience of explanation, an embodiment in which the first electrode plate 121 is a positive electrode plate and the second electrode plate 122 is a negative electrode plate will be described.

The electrode assembly 120 may include a positive electrode plate 121 having a first active material coated portion 121_a_ coated with a positive electrode active material (e.g., a transition metal oxide, such as $LiCoO_2$, $LiNiO_2$, $LiMn_2O_4$, etc.), a negative electrode plate 122 having a second active material coated portion $\mathbf{122}_a$ coated with a negative electrode active material (e.g., graphite, carbon, etc.), and the separator 123 located between the positive electrode plate 121 and the negative electrode plate 122 to prevent short circuits while allowing movement of lithium ions. Hereinafter, for convenience of explanation, the first active material coated portion $\mathbf{121}_a$ and the second active material coated portion 122_a_ will be described as the positive electrode active material coated portion 121_a_ and the negative electrode active material coated portion 122_a_, respectively.

The positive electrode plate 121, the negative electrode plate 122, and the separator 123 may be wound into a substantially cylindrical shape. In the illustrated embodiment, the positive electrode plate 121 may include an aluminum (Al) foil, the negative electrode plate 122 may include a copper (Cu) or nickel (Ni) foil, and the separator 123 may include polyethylene (PE) or polypropylene (PP).

As described above, the positive electrode plate 121 may be a plate-shaped metal foil made of aluminum (Al) and coated with a positive electrode active material made of a transition metal oxide on at least one surface. The positive electrode plate 121 may have, at the upper end, a first electrode uncoated portion 121_b_ that is not coated with the positive electrode active material. The first electrode uncoated portion 121_b_ may protrude upwardly from the electrode assembly 120. For example, the first electrode uncoated portion 121_b_ of the positive electrode plate 121 may protrude further upwardly compared to the negative electrode plate 122 and the separator 123 (e.g., the first electrode uncoated portion 121_b_ of the positive electrode plate 121 may protrude upwardly beyond or above the negative electrode plate 122 and the separator 123).

As described above, the negative electrode plate 122 may be a plate-shaped metal foil made of copper (Cu) or nickel (Ni) and coated with a negative electrode active material made of graphite or carbon on at least one surface. The negative electrode plate 122 may have, at the lower end, a second electrode uncoated portion 122_b_ that is not coated with the negative electrode active material. The second electrode uncoated portion 122_b_ may protrude downwardly from the electrode assembly 120. For example, the second electrode uncoated portion 122_b_ of the negative electrode plate 122 may protrude further downwardly compared to the positive electrode plate 121 and the separator 123 (e.g., the second electrode uncoated portion 122_b_ of the negative electrode plate 122 may protrude downwardly beyond or below the positive electrode plate 121 and the separator 123).

The first electrode uncoated portion 121_b_ may be a positive electrode uncoated portion, and the second electrode uncoated portion 122_b_ may be a negative electrode uncoated portion, but, in other embodiments, the opposite is possible. Hereinafter, for convenience of explanation, an embodiment in which the first electrode uncoated portion 121_b_ is a positive electrode uncoated region and the second electrode uncoated portion 122_b_ is a negative electrode uncoated region will be described.

In the illustrated embodiment, the positive electrode uncoated portion 121_b_ of the positive electrode plate 121 may include a first electrode tab 141 protruding upwardly by a length, and the negative electrode uncoated portion 122_b_ of the negative electrode plate 122 may include a second electrode tab 142 protruding downwardly by a length, but in other embodiments, the opposite is also possible.

In the illustrated embodiment, the first electrode tab 141 is cut from the positive electrode uncoated portion 121_b_ and, thus, may include the same material as the positive electrode uncoated portion 121_b_, for example, aluminum. In some embodiments, the second electrode tab 142 is cut from the negative electrode uncoated portion 122_b_ and, thus, may include the same material as the negative electrode uncoated portion 122_b_, for example, copper or nickel. The first electrode tab 141 may be a positive electrode tab, and the second electrode tab 142 may be a negative electrode tab. In other embodiments, however, the opposite is possible. Hereinafter, for convenience of explanation, an embodiment in which the first electrode tab 141 is a positive electrode tab and the second electrode tab 142 is a negative electrode tab will be described. The positive electrode tab 141 of the electrode assembly 120 may be connected to the cap assembly 190, and the negative electrode tab 142 may be connected to the bottom portion 111 of the cylindrical can 110. The positive electrode tab 141 and the cap assembly 190 at the upper side may be electrically connected by a first lead tab 141_a_ welded to the positive electrode tab 141. In some embodiments, the negative electrode tab 142 and the bottom portion 111 may be electrically connected to the second lead tab 142_a_ welded to the negative electrode tab 142. In some embodiments, the positive electrode tab 141 and the cap assembly 190 may be connected by the first lead tab 141_a_, and the negative electrode tab 142 and the bottom portion 111 may be directly connected without a separate lead tab, but in other embodiments, the opposite is possible.

The electrode assembly 120 may be referred to as an electrode group or an electrode. In the illustrated embodiment, as described above, the negative electrode tab 142 of the electrode assembly 120 may be welded to the bottom portion 111 of the cylindrical can 110 or may be connected to the second lead tab 142_a_. Therefore, the cylindrical can 110 may act as a negative electrode. For example, conversely, the positive electrode tab 141 may be connected to the bottom portion 111 of the cylindrical can 110, and in this embodiment, the cylindrical can 110 may act as a positive electrode.

The upper insulating plate 150 is coupled to the cylindrical can 110 and may have a first hole 150*a* formed in the center thereof and a plurality of second holes 150*b* formed outside of (e.g., around) the first hole 150*a*. In some embodiments, the upper insulating plate 150 may be interposed between the electrode assembly 120 and the cap assembly 190. The upper insulating plate 150 may prevent the electrode assembly 120 from electrically contacting the cap assembly 190. In the illustrated embodiment, the upper insulating plate 150 may prevent the positive electrode plate 121 of the electrode assembly 120 from electrically contacting the cap assembly 190.

When a large amount of gas is generated due to an abnormality in the secondary battery 100, the first hole 150*a* may allow the gas to quickly move toward the cap assembly 190. In the illustrated embodiment, the second hole 150*b* may allow the positive electrode tab 141 or the first lead tab 141*a* to pass through the upper insulating plate 150 to be welded to the cap assembly 190. In some embodiments, the remaining second holes 150*b* allow the electrolyte to quickly flow into the electrode assembly 120 during an electrolyte injection process.

The lower insulating plate 160 is coupled to the cylindrical can 110 and may have a first hole 160*a* at the center thereof and a second hole 160*b* formed at the outside (e.g., offset from) the first hole 160*a*. In some embodiments, the lower insulating plate 160 may be interposed between the electrode assembly 120 and the bottom portion 111. The lower insulating plate 160 may prevent the electrode assembly 120 from electrically contacting the bottom portion 111 of the cylindrical can 110. In the illustrated embodiment, the lower insulating plate 160 may prevent the negative electrode plate 122 of the electrode assembly 120 from electrically contacting the bottom portion 111.

When a large amount of gas is generated due to an abnormality in the secondary battery, the first hole 160*a* may allow the gas to quickly move upwardly (or downwardly). In some embodiments, the second hole 160*b* may allow the negative electrode tab 142 or the second lead tab 142*a* to pass through the lower insulating plate 160 to be welded to the bottom portion 111.

The insulation tape 170 may include at least one of a first insulation tape 171 and a second insulation tape 172. In one embodiment, the first insulation tape 171 is attached to a portion of the positive electrode tab 141 of the positive electrode plate 121, and the second insulation tape 172 is attached to a portion of the negative electrode tab 142 of the negative electrode plate 122. A more detailed description of the insulation tape 170 will be provided later.

The cap assembly 190 may include a cap-up 191 having a plurality of through holes (e.g., openings) 191*a*, a safety vent 192 located below the cap-up 191, and a connection ring 193 and a cap-down 194, both located below the safety vent 192. In the illustrated embodiment, the cap-down 194 is located below the safety vent 192 and the connection ring 193, has a plurality of through holes 194*a*, and can be electrically connected to the positive electrode tab 141 or the first lead tab 141*a*. In the illustrated embodiment, the cap assembly 190 may further include an insulation gasket 195 that insulates the cap-up 191, the safety vent 192, and the cap-down 194 from the side portion 112 of the cylindrical can 110. The insulation gasket 195 may be substantially compressed between the beading part 113 and the crimping part 114 formed in the side portion 112 of the cylindrical can 110. In the illustrated embodiment, the through holes 191*a* in the cap-up 191 and the through holes 194*a* in the cap-down 194 may discharge internal gas to the outside when abnormal internal pressure occurs inside the cylindrical can 110.

Further, gas causing such abnormal internal pressure passes upwardly through the through holes 194*a* in the cap-down 194 and inverts the safety vent 192, and thus, the safety vent 192 may be electrically separated from the cap-down 194. Subsequently, the safety vent 192 is torn (e.g., is opened or burst), the internal gas may be released to the outside through the through holes 191*a* in the cap-up 191.

An electrolyte may be injected into the cylindrical can 110. This allows lithium ions generated by electrochemical reactions to move between the negative electrode plate 122 and the positive electrode plate 121 inside the battery during charging and discharging. The electrolyte may include a non-aqueous organic electrolyte that is a mixture of a lithium salt and a high-purity organic solvent. In some embodiments, the electrolyte may include a polymer or solid electrolyte using a polymer electrolyte.

Figure 4:
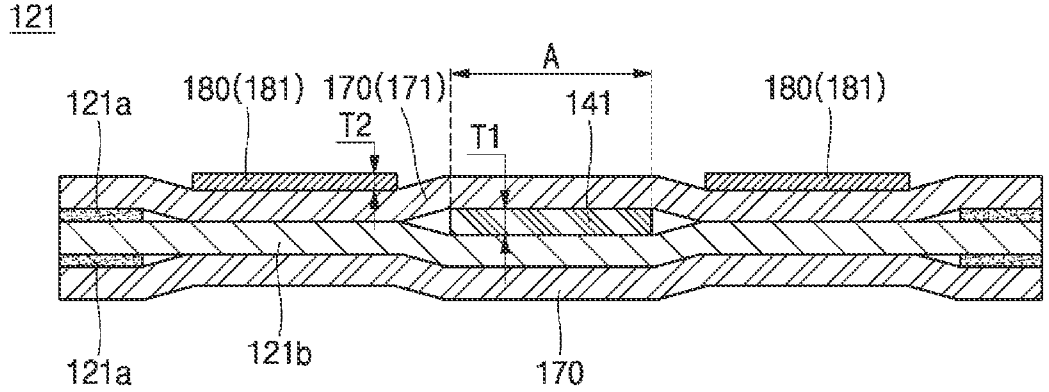
FIG. 4 is a cross-sectional view of a step compensation unit formed on an upper portion of a first electrode plate according to an embodiment of the present disclosure.
Figure 5:
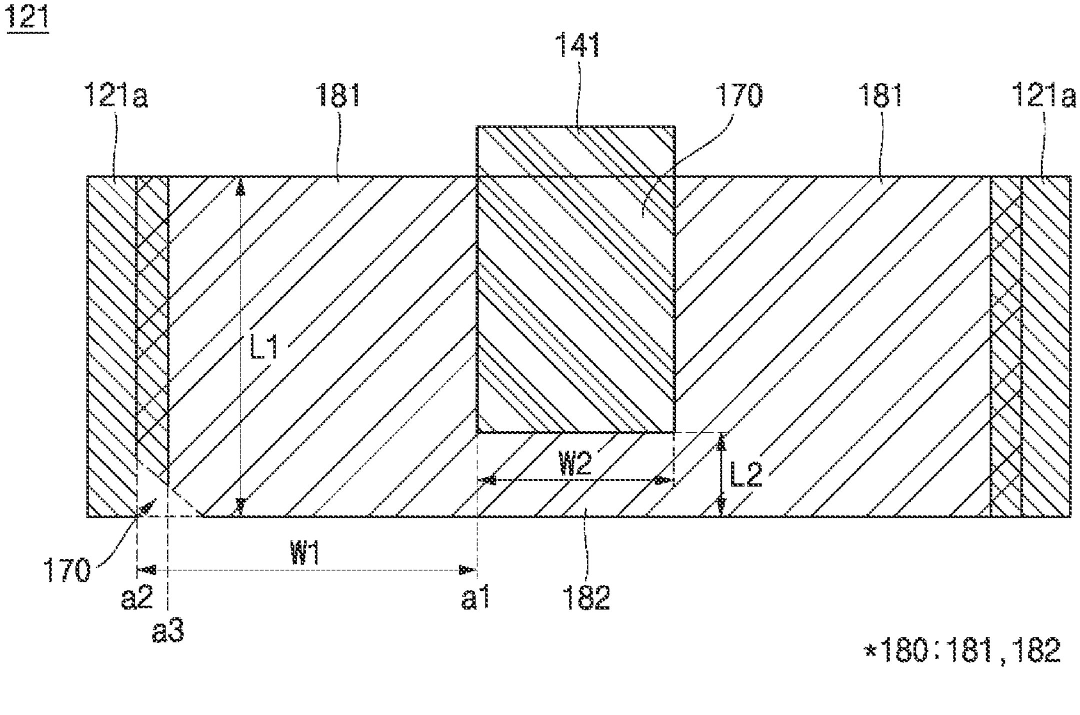
FIG. 5 is a plan view showing a width and length range of the step compensation unit shown in FIG. 4.
Figure 6:
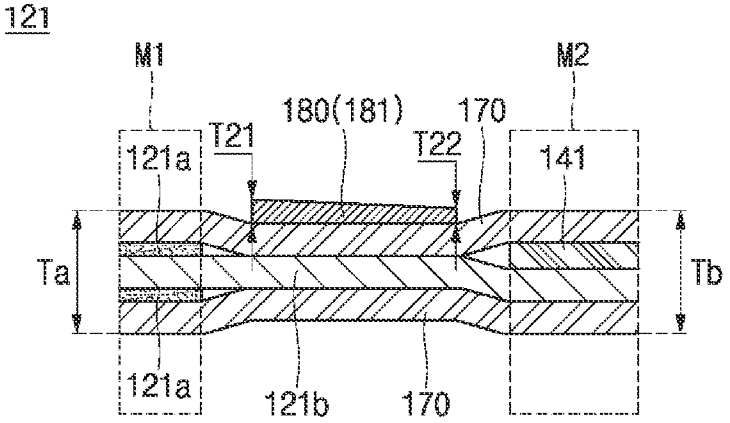
FIG. 6 is a cross-sectional view of an embodiment in which the step compensation unit formed on the first electrode plate has different thicknesses.
Figure 7:
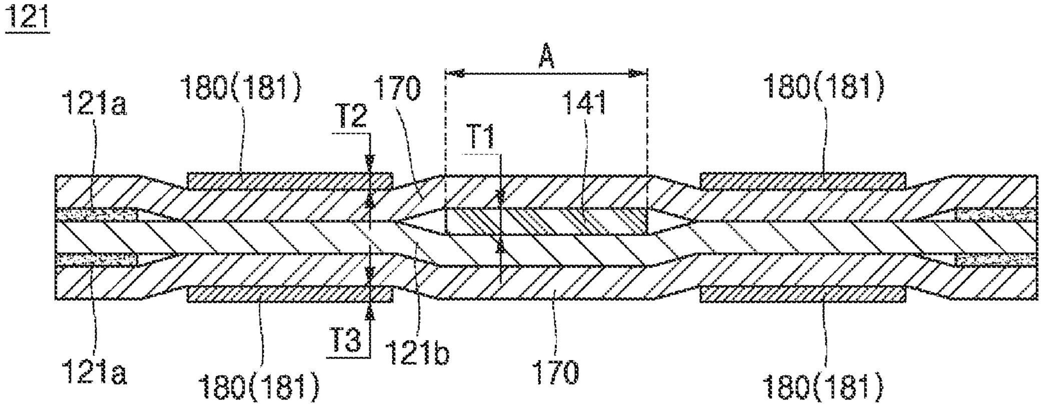
FIG. 7 is a cross-sectional view of a step compensation unit formed on the upper and lower portions of a first electrode plate according to an embodiment of the present disclosure.
Figure 8:
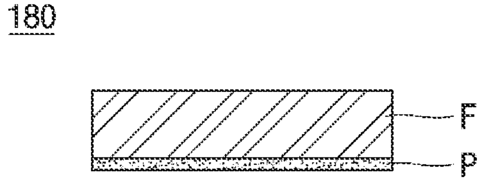
FIG. 8 is a diagram showing the cross-sectional configuration of a step compensation unit according to an embodiment of the present disclosure.

FIG. 4 is a cross-sectional view of a step compensation unit formed on the upper portion of a first electrode plate according to an embodiment of the present disclosure, FIG. 5 is a plan view showing a width and length range of the step compensation unit shown in FIG. 4, FIG. 6 is a cross-sectional of an embodiment in which the step compensation unit formed on the first electrode plate has different thicknesses according to an embodiment of the present disclosure, FIG. 7 is a cross-sectional view of a step compensation unit formed on the upper and lower portions of a first electrode plate according to an embodiment of the present disclosure, and FIG. 8 is a diagram showing the cross-sectional configuration of a step compensation unit according to an embodiment of the present disclosure.

As shown in FIG. 4, the step compensation unit 180 may be formed on a region of (e.g., a portion of) the upper portion of the insulation tape 170 excluding the region corresponding to (or overlapping) the positive electrode tab 141.

For example, the step compensation unit 180 may include first step compensation units 181 and a second step compensation unit 182, as shown in, for example, FIG. 5.

The first step compensation units 181 may be formed at both ends of the insulation tape 170 and on the upper surface of the insulation tape 170. The second step compensation unit 182 may be formed on a region not corresponding to (e.g., offset from) the positive electrode tab 141 and in the region between the first step compensation units 181. Accordingly, in the step compensation unit 180, the first step compensation units 181 formed at both sides of the positive electrode tab 141 and the second step compensation unit 182 connecting (or extending between) the first step compensation units 181 may be integrated (or integrally formed). In such an embodiment, the step compensation unit 180 may have an approximately “U” shape, but the planar structure of the step compensation unit 180 is not limited to this shape and may be modified into various shapes.

The width (W1) of the first step compensation units 181 may range (or span or extend) from one end a1 of the positive electrode tab 141 to one end a2 of the insulation tape 170. The insulation tape 170 may be formed on the upper surface of the positive electrode plate 121 to cover the positive electrode tab 141, the first electrode uncoated portion 121*b*, and a portion of the positive electrode active material coated portion 121*a*. In this way, the width (W1) of the first step compensation units 181 may be limited such that it reaches (or extends to) the one end a2 of the insulation tape 170 while not overlapping the positive electrode tab

141, but the width (W1) of the first step compensation units 181 may be in a range between the ends a3 of the first electrode uncoated portion 121*b* while not overlapping the positive electrode tab 141. The length (L1) of the first step compensation units 181 is not limited but may be within the range between the upper and lower ends of the insulation tape 170. The width (W2) of the second step compensation unit 182 may be about the width of the positive electrode tab 141, and the length (L2) of the second step compensation unit 182 may be in the range between the lower end of the positive electrode tab 141 and the lower end of the insulation tape 170.

The step compensation unit 180 compensates for the thickness of a relatively thin portion around the positive electrode tab 141 by the positive electrode tab 141 (e.g., the step compensation unit 180 compensates for a relatively thinner portion of the electrode assembly 120 where the non-coated portions and the electrode tabs are not present), and the upper surface of the step compensation unit 180 may be aligned with the upper surface (A) of the insulation tape 170 corresponding to the positive electrode tab 141 but may be relatively lower or higher than the upper surface (A) of the insulation tape 170. For example, the thickness (T2) of the step compensation unit 180 may be in a range of about $0.1*T1 \leq T2 \leq 1.5*T1$, as shown in FIG. 4, where T1 is the thickness of the positive electrode tab 141.

When the thickness (T2) of the step compensation unit 180 is excessively thick (exceeding about 150%) compared to the thickness (T1) of the positive electrode tab 141, cell capacity may be reduced, which may be disadvantageous, and the step compensation unit 180 may impart pressure on a positive electrode substrate. Accordingly, in consideration of the tolerance of the step compensation unit 180, the positive electrode tab 141 may be formed up to about 150% of the thickness (T1). In some embodiments, when the step compensation unit 180 is thinner than the positive electrode tab 141, there would be no problem, but in order to allow the effect of the step compensation unit 180 to be fully demonstrated, the thickness (T2) of the step compensation unit 180 may be at least about 10% of the thickness (T1) of the positive electrode tab 141.

As shown in FIG. 6, in the positive electrode plate 121, when the thickness (Ta) of a first layer M1 including a positive electrode substrate, the positive electrode active material coated portion 121*a*, and the insulation tape 170 is different from the thickness (Tb) of a second layer M2 including a positive electrode substrate, the positive electrode tab 141, and the insulation tape 170, the step compensation unit 180 may be formed to have a thickness that gradually decreases or increases in the direction from the first layer M1 to the second layer M2 so that the cross section thereof may be formed to be inclined.

For example, when the thickness (Ta) of the first layer M1 is greater than the thickness (Tb) of the second layer M2, the step compensation unit 180 may be formed to have a thickness that gradually decreases in the direction from the first layer M1 to the second layer M2. In the step compensation unit 180 shown in FIG. 6, the thickness (T21) of the left portion thereof is greater than the thickness (T22) of the right portion thereof.

Conversely, when the thickness (Ta) of the first layer M1 is smaller than the thickness (Tb) of the second layer M2, the step compensation unit 180 may be formed to have a thickness that gradually increases in the direction from the first layer M1 to the second layer M2. In such an embodiment, the thickness (T21) of the left portion of the step compensation unit 180 may be smaller than the thickness (T22) of the right portion.

In some embodiments, as shown in, for example, FIG. 7, the insulation tape 170 may be additionally formed, in the same shape at its position corresponding to the upper surface, on the lower surface of the first electrode uncoated portion 121*b*, opposite to the upper surface, to which the positive electrode tab 141 is connected. In such an embodiment, the step compensation unit 180 may also be formed in the same shape on the lower surface of the first electrode uncoated portion 121*b* at its position corresponding to the upper surface. The total thickness (T2+T3) of the step compensation unit 180 may be in a range of about $0.1*T1 \leq T2+T3 \leq 1.5*T1$. Here, T1 is the thickness of the positive electrode tab 141, T2 is the thickness of the step compensation unit 180 formed on the upper surface of the first electrode uncoated portion 121*b*, and $T_3$ is the thickness of the step compensation unit 180 formed on the lower surface of the first electrode uncoated portion 121*b*.

The step compensation unit 180 may be an adhesive tape including a film (F) and an adhesive layer (P) formed on the lower surface of the film (F). The film (F) may include a polyimide (PI), polyethylene terephthalate (PET), or polypropylene (PP) material, and the adhesive layer (P) may include an adhesive including at least one of an acrylic compound, a rubber compound, or a hydrocarbon resin compound.

Figure 9:
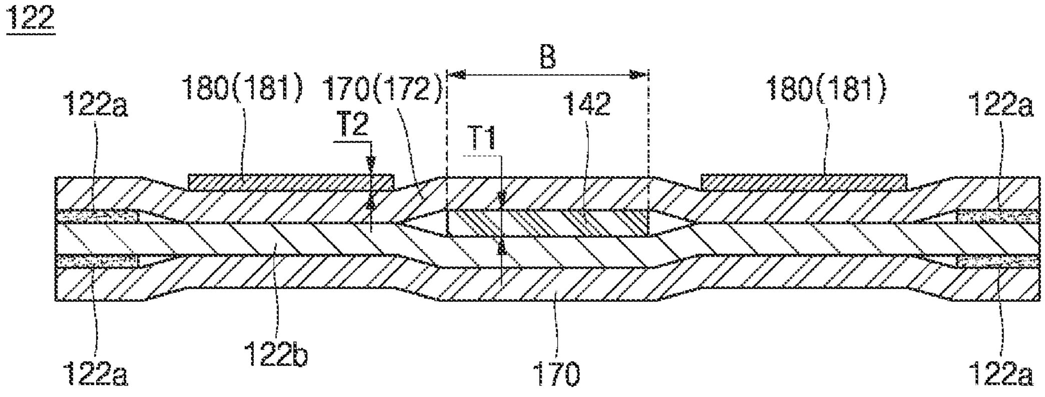
FIG. 9 is a cross-sectional view of a step compensation unit formed on the upper portion of a second electrode plate according to an embodiment of the present disclosure.
Figure 10:
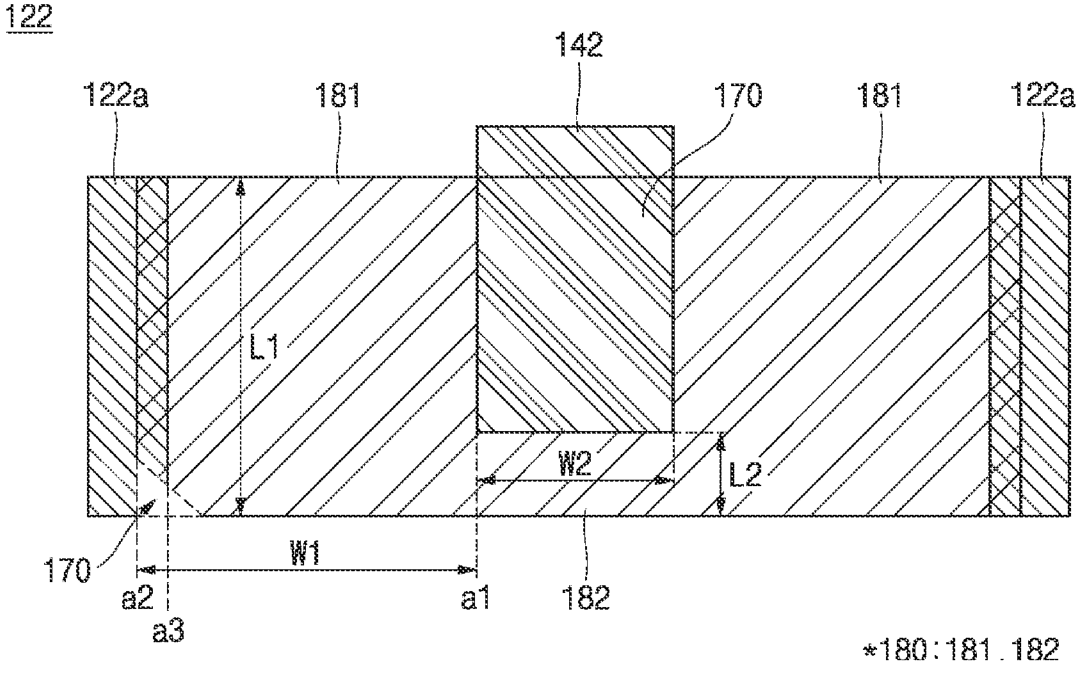
FIG. 10 is a plan view of a width and length range of the step compensation unit shown in FIG. 9.
Figure 11:
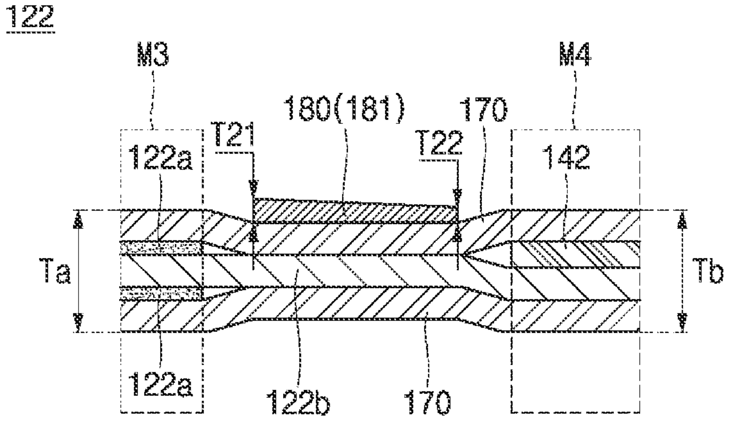
FIG. 11 is a cross-sectional view of an embodiment in which the step compensation unit formed on the second electrode plate has different thicknesses.
Figure 12:
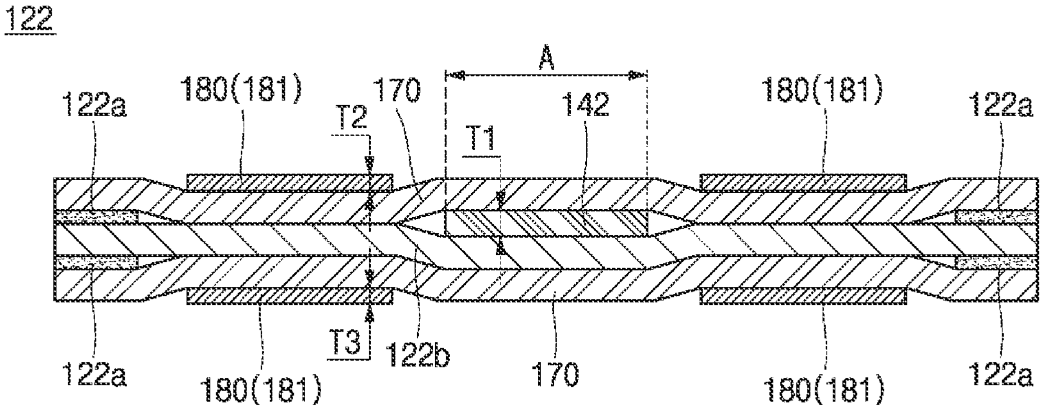
FIG. 12 is a cross-sectional view of a step compensation unit formed on the top and bottom of the second electrode plate according to an embodiment of the present disclosure.

FIG. 9 is a cross-sectional view of a step compensation unit formed on the upper portion of a second electrode plate according to an embodiment of the present disclosure, FIG. 10 is a plan view showing a width and length range of the step compensation unit shown in FIG. 9, FIG. 11 is a cross-sectional view of an embodiment in which the step compensation unit formed on the second electrode plate is formed to have different thicknesses, and FIG. 12 is a cross-sectional view of a step compensation unit formed on the top and bottom of the second electrode plate according to an embodiment of the present disclosure.

As shown in FIG. 9, the step compensation unit 180 may be formed on the upper portion of the insulation tape 170, excluding the region (B) corresponding to the negative electrode tab 142.

For example, as shown in FIG. 10, the step compensation unit 180 may include first step compensation units 181 and a second step compensation unit 182.

The first step compensation units 181 may be formed at both ends of the insulation tape 170 on the upper surface of the insulation tape 170. The second step compensation unit 182 may be formed on a region not corresponding to (e.g., offset from) the negative electrode tab 142 at the region between the first step compensation units 181. Accordingly, in the step compensation unit 180, the first step compensation units 181 formed at both sides of the negative electrode tab 142, and the second step compensation unit 182 connecting (or extending between) the first step compensation units 181 may be integrated (or integrally formed). The step compensation unit 180 may have an approximate "U" shape, but the planar structure of the step compensation unit 180 is not limited to this shape and may be modified into various shapes.

The width (W1) of the first step compensation units 181 may range (or extend or span) from one end a1 of the negative electrode tab 142 to one end a2 of the insulation tape 170. The insulation tape 170 may be formed on the upper surface of the negative electrode plate 122 to cover the negative electrode tab 142, the second electrode uncoated portion 122*b*, and a portion of the negative electrode active material coated portion 122*a*. In this way, the width (W1) of the first step compensation units 181 may be limited to a range that reaches (or extends to) the one end a2 of the insulation tape 170 while not overlapping the negative electrode tab 142, but the width (W1) of the first step compensation units 181 may be in a range between the ends a3 of the second electrode uncoated portion 122*b* while not overlapping the negative electrode tab 142. The length (L1) of the first step compensation units 181 is not limited but may be within the range between the upper and lower ends of the insulation tape 170. The width (W2) of the second step compensation unit 182 may be about the width of the negative electrode tab 142, and the length (L2) of the second step compensation unit 182 may be in the range between the lower end of the negative electrode tab 142 to the lower end of the insulation tape 170.

The step compensation unit 180 compensates for the thickness of a relatively thin portion around the negative electrode tab 142 caused by the negative electrode tab 142, and the upper surface of the step compensation unit 180 may be aligned with the upper surface (A) of the insulation tape 170 corresponding to the positive electrode tab 141 but may be relatively lower or higher than the upper surface (B) of the insulation tape 170. For example, the thickness (T2) of the step compensation unit 180 may be in the range of about $0.1*T1 \leq T2 \leq 1.5*T1$, as shown in FIG. 9, where T1 is the thickness of the negative electrode tab 142.

When the thickness (T2) of the step compensation unit 180 is excessively thick (exceeding about 150%) compared to the thickness (T1) of the negative electrode tab 142, cell capacity may be reduced, which may be disadvantageous, and the step compensation unit 180 may impart pressure on a negative electrode substrate. Accordingly, in consideration of the tolerance of the step compensation unit 180, the negative electrode tab 142 may be formed up to about 150% of the thickness (T1). In some embodiments, when the step compensation unit 180 is thinner than the negative electrode tab 142, there would be no problem, but in order to allow the effect of the step compensation unit 180 to be fully demonstrated, the thickness (T2) of the step compensation unit 180 is at least about 10% of the thickness (T1) of the negative electrode tab 142.

As shown in FIG. 11, in the negative electrode plate 122, when the thickness (Ta) of a third layer M3 including a negative electrode substrate, the negative electrode active material coated portion 122*a*, and the insulation tape 170 is different from the thickness (Tb) of a fourth layer M4 including a negative electrode substrate, the negative electrode tab 142, and the insulation tape 170, the step compensation unit 180 may be formed to have a thickness that gradually decreases or increases in the direction from the third layer M3 to the fourth layer M4 so that the cross section thereof may be formed to be inclined.

For example, when the thickness (Ta) of the third layer M3 is greater than the thickness (Tb) of the fourth layer M4, the step compensation unit 180 may be formed to have a thickness that gradually decreases in the direction from the third layer M3 to the fourth layer M4. In the step compensation unit 180 shown in FIG. 11, the thickness (T21) of the left portion thereof is greater than the thickness (T22) of the right portion thereof.

Conversely, when the thickness (Ta) of the third layer M3 is smaller than the thickness (Tb) of the fourth layer M4, the step compensation unit 180 may be formed to have a thickness that gradually increases in the direction from the third layer M3 to the fourth layer M4. In such an embodiment, the thickness (T21) of the left portion of the step compensation unit 180 may be smaller than the thickness (T22) of the right portion thereof.

In some embodiments, as shown in, for example, FIG. 12, the insulation tape 170 may be additionally formed in the same shape, at a position corresponding to the upper surface, on the lower surface of the first electrode uncoated portion 121*b*, opposite to the upper surface, to which the positive electrode tab 141 is connected. The step compensation unit 180 may also be formed in the same shape on the lower surface of the second electrode uncoated portion 122*b* at a position corresponding to its position on the upper surface. The total thickness (T2+T3) of the step compensation unit 180 may be in the range of about $0.1*T1 \leq T2+T3 \leq 1.5*T1$. Here, T1 is the thickness of the negative electrode tab 142, T2 is the thickness of the step compensation unit 180 formed on the upper surface of the second electrode uncoated portion 122*b*, and T3 is the thickness of the step compensation unit 180 formed on the lower surface of the second electrode uncoated portion 122*b*.

As described above, in secondary battery according to embodiments of the present disclosure, the pressure applied to an electrode tab is compensated for by attaching a tape having the same thickness as the electrode tab to an electrode uncoated portion (e.g., a portion of the electrode film not coated with an active material) around the electrode tab, thereby reducing or minimizing cracks or ruptures that may occur along the boundary area of an existing electrode tab.

The foregoing embodiments are only some embodiments for carrying out the present disclosure, which is not limited to these embodiments. Thus, it will be understood by a person skilled in the art that various changes in form and details may be made therein without departing from the spirit and scope of the present disclosure as defined by the following claims and their equivalents.

What is claimed is:

1. A secondary battery comprising:
- a first electrode plate comprising a first substrate having a first active material coated portion coated with a first active material and a first electrode uncoated portion not coated with the first active material;
- a second electrode plate comprising on a second substrate having a second active material coated portion coated with a second active material and a second electrode uncoated portion not coated with the second active material;
- a separator between the first electrode plate and the second electrode plate;
- an electrode tab connected to one of the first electrode uncoated portion and the second electrode uncoated portion;
- an insulation tape on the first electrode uncoated portion or the second electrode uncoated portion and covering the electrode tab; and
- a step compensation unit on a region of an upper surface of the insulation tape excluding a region corresponding to the electrode tab.

2. The secondary battery as claimed in claim 1, wherein the step compensation unit comprises first step compensation units on both ends of the insulation tape at the upper surface of the insulation tape.

3. The secondary battery as claimed in claim 2, wherein the step compensation unit further comprises a second step compensation unit on a region of the insulation tape between the first step compensation units and that does not correspond to the electrode tab.

4. The secondary battery as claimed in claim 3, wherein the first step compensation units are connected to each other with the second step compensation unit therebetween.

5. The secondary battery as claimed in claim 1, wherein a width of the step compensation unit extends from one end of the electrode tab to one end of the insulation tape.

6. The secondary battery as claimed in claim 5, wherein the insulation tape is on the upper surface of the first electrode plate to cover the electrode tab, the first electrode uncoated portion, and a portion of the first active material coated portion or is on the upper surface of the second electrode plate to cover the electrode tab, the second electrode uncoated portion, and a portion of the second active material coated portion.

7. The secondary battery as claimed in claim 1, wherein a thickness $T_2$ of the step compensation unit is in a range of $0.1*T_1 \leq T_2 \leq 1.5*T_1$, where $T_1$ is a thickness of the electrode tab.

8. The secondary battery as claimed in claim 1, wherein:

when a thickness of a first layer comprising the first substrate, the first active material coated portion, and the insulation tape is different from a thickness of a second layer comprising the first substrate, the electrode tab, and the insulation tape, the step compensation unit has a thickness that gradually decreases or increases in a direction from the first layer to the second layer; or in the second electrode plate, when a thickness of a third layer comprising the second substrate, the second active material coated portion, and the insulation tape is different from a thickness of a fourth layer comprising the second substrate, the electrode tab, and the insulation tape, the step compensation unit has a thickness that gradually decreases or increases in a direction from the third layer to the fourth layer.

9. The secondary battery as claimed in claim 1, wherein:

the insulation tape is additionally arranged in the same shape on a lower surface opposite to the upper surface of the first electrode uncoated portion or the second electrode uncoated portion to which the electrode tab is connected at a position corresponding to the upper surface; and the step compensation unit is additionally arranged in the same shape on a lower surface of the first electrode uncoated portion or the second electrode uncoated portion at a position corresponding to the upper surface.

10. The secondary battery as claimed in claim 9, wherein a total thickness $(T_2+T_3)$ of the step compensation unit is in a range of $0.1*T_1 \leq T_2+T_3 \leq 1.5*T_1$, where $T_1$ is a thickness of the electrode tab, $T_2$ is a thickness of the step compensation unit on the upper surface of the first electrode uncoated portion or the second electrode uncoated portion, and $T_3$ is a thickness of the step compensation unit on the lower surface of the first electrode uncoated portion or the second electrode uncoated portion.

11. The secondary battery as claimed in claim 1, wherein the step compensation unit comprises an adhesive tape comprising a film and an adhesive layer on a lower surface of the film.

12. The secondary battery as claimed in claim 11, wherein the film comprises polyimide, polyethylene terephthalate, or polypropylene, and the adhesive layer comprises an acrylic compound, a rubber compound, or a hydrocarbon resin compound.

* * * * *